Oct. 24, 1939.  G. PERERA ET AL  2,177,150
MOUNTING FRAME FOR PICTURES AND THE LIKE
Filed July 26, 1939  2 Sheets-Sheet 1
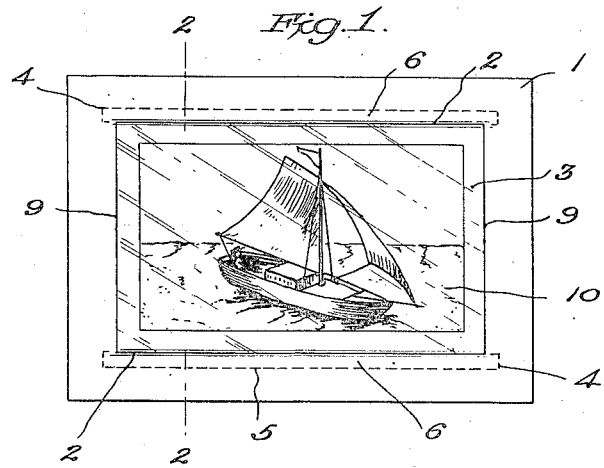
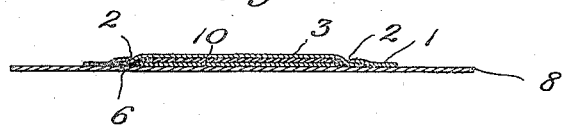
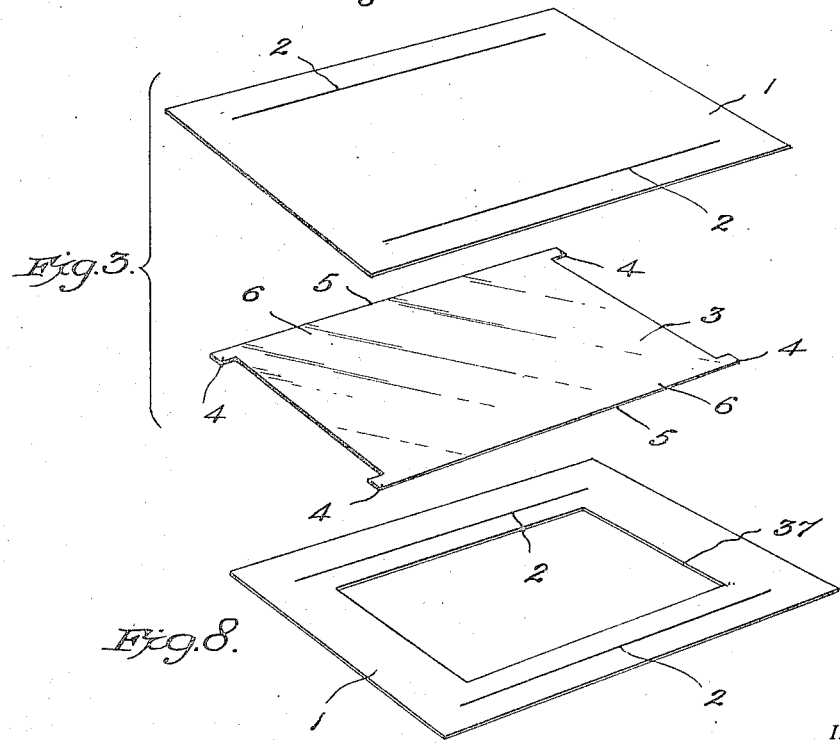
INVENTORS
GUIDO PERERA
BY ROBERT C. MYLES, JR.

Oct. 24, 1939.  G. PERERA ET AL  2,177,150
MOUNTING FRAME FOR PICTURES AND THE LIKE
Filed July 26, 1939   2 Sheets-Sheet 2
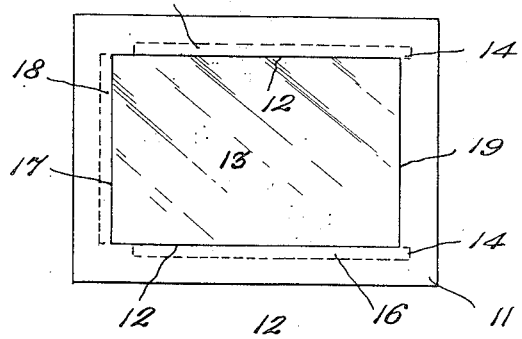
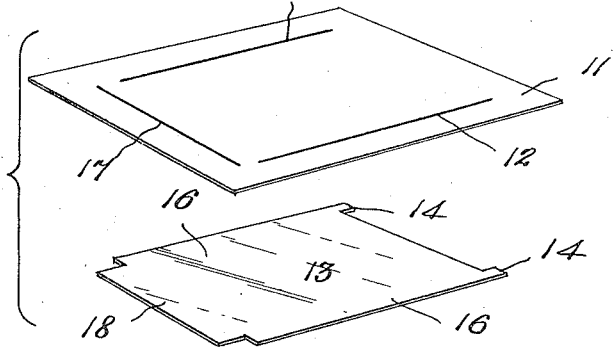
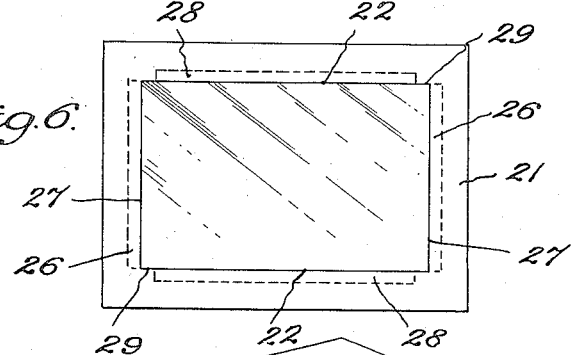
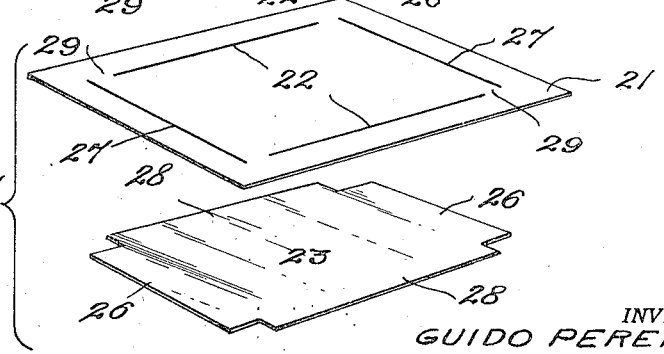
INVENTORS
GUIDO PERERA
BY ROBERT C. MYLES, JR
ATTORNEY.

Patented Oct. 24, 1939

2,177,150

UNITED STATES PATENT OFFICE 2,177,150

MOUNTING FRAME FOR PICTURES AND THE LIKE

Guido Perera and Robert C. Myles, Jr., New York, N. Y.

Application July 26, 1939, Serial No. 286,524

3 Claims. (Cl. 40—158)

The present invention relates to mounting frames for pictures, snapshots, stamps, and the like and, more particularly, to a transparent mounting frame of novel and improved character for picture albums.

Heretofore, various mounting frames have been proposed for pictures and snapshots. They have been made of various materials such as metal, wood, paper, cardboard, and the like. All of these conventional picture frames had the disadvantage that they have been relatively expensive. Moreover, these prior frames have been rather bulky and could not be used for preserving and holding a large number of pictures, such as is necessary, for example, in albums for snapshots, pictures, stamps, and similar pictorial representations.

It is an object of the present invention to eliminate the disadvantages of conventional picture mounting frames.

It is another object of the invention to provide a mounting frame of novel and improved character having a transparent protective cover plate for protecting the mounted picture from dust, dirt and mechanical injury.

A further object of the invention is to provide a mounting frame for pictures constituted of thin and flexible material combined with a transparent cover plate of which a large number may be mounted in a picture album without increasing the dimensions thereof.

The invention also contemplates an extremely thin and flexible mounting frame constituted of a base and of a flexible cover plate attached to such base without any cementing agent.

It is also within the contemplation of the invention to provide a mounting frame for pictures which is simple in construction and which may be manufactured on a practical and industrial scale at a very moderate cost.

Other and further objects and advantages of the invention will become apparent from the following description taken in conjunction with the accompanying drawings, in which:

Fig. 1 illustrates a top elevational view of a mounting frame embodying the principles of the present invention;

Fig. 2 depicts a vertical sectional view taken on line 2—2 of Fig. 1;

Fig. 3 shows a perspective view of the base portion and of the cover plate portion of the mounting frame shown in Figs. 1 and 2 prior to their final assembly;

Fig. 4 illustrates a top elevational view of a modified embodiment of the invention;

Fig. 5 depicts a perspective view of the base portion and of the cover plate portion of the mounting frame shown in Fig. 4 prior to their assemblage;

Fig. 6 shows a top elevational view of a further modified embodiment of the invention;

Fig. 7 is a perspective view of the base portion and of the cover plate portion of the mounting frame shown in Fig. 6 prior to their assemblage; and Fig. 8 depicts a perspective view similar to Fig. 3 of a modified base portion for the mounting frames of the invention.

Broadly stated, according to the principles of the invention, a base portion is provided constituted of paper, cardboard, impregnated linen, or some other similar thin and sheet-like material having strength and at least some flexibility. In this base we provide a plurality of slits adapted to receive and to hold corresponding extensions of a transparent cover plate. Various transparent sheet-like materials may be used for the cover plate, such as Celluloid and particularly a transparent sheet-like material sold under the name Cellophane. We prefer to provide the base portion in a substantially quadrangular form and arrange the slits in parallel spaced relationship with some or all of the side edges thereof. Of course, a large number of variations are possible in the form, shape and relative arrangement of the base portion and of the cover plate, the essential consideration being that the cover plate is retained on and above the base portion merely by means of suitably formed tongues, ears or extensions. It is generally preferred to provide a coating of cementitious agent on the back face of the mounting frame whereby the frame may be cemented to any suitable surface, such as a board, a sheet of cardboard or on one of the pages of an album. Of course, instead of providing the coating of cementitious agent on the back face of the base portion during the process of manufacture, a suitable cementitious material may be applied immediately before attaching the frame to a supporting surface. We have also found that generally it is unnecessary to provide a quadrangular base having a complete and full surface and that it is possible to provide an opening or window in the center portion thereof to save material, to lighten the frame and to obtain an extremely simple, light and inexpensive structure.

Referring now more particularly to Figs. 1 to 3 of the drawings, a preferred embodiment of the invention will be described. Reference character 1 denotes the base portion constituted of a flexible sheet-like material and having a generally quadrangular form. In this base portion we provide two longitudinal slits 2 in parallel-spaced position with two opposite side edges of the base portion. These slits have the object of removably retaining a cover plate 3 constituted of a flexible and transparent sheet-like material. As it will be best observed in Fig. 3, cover plate 3 is of a generally rectangular form having a length substantially identical with that of slits 2 and a width which is somewhat greater than the distance between slits 2. In addition to this, cover plate 3 is provided with integrally formed extensions or tongues 4 at each corner thereof. When assembling the mounting frame of the invention, side edges 5 of cover plate 3 are inserted through slits 2 of base portion 1. Although due to the presence of tongues 4 the length of side edges 5 of cover plate 3 is greater than the length of slits 2, this insertion can be readily accomplished in view of the thin and flexible character of the cover plate. As it will appear from Figs. 1 and 2, in this assembled condition, longitudinal marginal portions 6 of cover plate 3 will lie underneath the base portion and due to tongues 4 extending beyond slits 2 will be securely retained in this position. It will be readily appreciated that in this assembled position, the two longitudinal edges of the cover plate will be interlocked with the base plate while their shorter lateral edges will remain above the base portion and will provide ports or openings through which a picture or snapshot may be introduced from the front. We have found that, although these ports are open all the time, the friction between the cover plate, base portion and the picture is sufficient to prevent accidental displacement of the picture which will be positively retained in its inserted position. From the foregoing description it appears that the mounting frame of the invention illustrated in Figs. 1 to 3 has a pair of ports 9 through which picture 10 may be introduced and adjusted preferably by means of a pair of tweezers. We also prefer to provide a coating of cementitious material on the back surface of the frame portion so that it may be pasted or cemented to any suitable supporting surface 8, for example, on one of the pages of a picture album.

Figs. 4 and 5 illustrate a modified embodiment of the invention. Essentially a base portion 11 is provided similar to base portion 1 of the previous embodiment and constituted of a flexible sheet-like material. Base portion 11 is provided with two longitudinal incisions or slits 12 arranged in parallel-spaced position with the longitudinal side edges of the base portion. In addition, a third incision or slit 17 is provided parallel to one of the side edges of the base portion and ending at some distance from the corresponding ends of slits 12. A cover plate 13 constituted of sheet-like flexible and transparent material is provided for covering the base portion. Said cover plate has two small extensions or tongues 14 at the two ends of one of its lateral edges and an extension 18 at the opposite end thereof. The cover plate has a width which is slightly in excess of the distance between the two incisions 12 and has a length which is slightly in excess of the distance between one of the ends of the incisions 12 and the corresponding end of incision 17. The assemblage of this modified form of mounting frame will be observed in Fig. 4. As will be readily seen in Fig. 4, when assembling the mounting frame, marginal portions 16 of the cover plate are passed through incisions 12 and marginal portion or extension 18 of the cover plate is passed through incision 17. Although the marginal portions 16 together with the tongues 14 have a length which is greater than that of incisions 12, no difficulty will be experienced in inserting the cover plate in view of the readily flexible character thereof. In the assembled condition, tongues 14 will lie underneath the base portion, same as extension 18 and marginal portions 16 whereby the cover plate will be securely locked in the base portion and accidental displacements thereof will be impossible. It will be noted that in the assembled condition the cover plate will have one of its side edges lying above the base portion and will provide an opening or port 19 through which a picture or similar article may be introduced. Due to the elasticity of the complete structure and of the resilient construction of the assemblage, the picture introduced through port 19 will be securely retained in its adjusted position and will be exposed to view. At the same time, of course, the cover plate will protect the picture against the detrimental influences of dust, dirt or mechanical injury. Same as the embodiment illustrated in Figs. 1 to 3, the back face of base portion 11 may be provided with a coating of a cementitious material for the purpose of cementing the mounting frame to a supporting surface of suitable character.

While the embodiments of the invention illustrated in Figs. 1 to 5 have at least one permanently open port for the introduction of a picture, the modified embodiment shown in Figs. 6 and 7 has no opening in its assembled and mounted condition so that the picture has to be inserted prior to cementing the complete mounting frame to a supporting surface. This modified embodiment comprises a base portion 21 of sheet-like material having incisions 22 in parallel-spaced position with its longitudinal edges and incisions 27 located in parallel-spaced position with its lateral edges. Incisions or slits 22 are slightly shorter than the distance between incisions 27 so that small unslitted interspaces 29 are provided between the ends of slits 22 and 27. Cover plate 23 is of a substantially quadrangular character and has extensions 26 and 28 at each of its sides. With these extensions, the longitudinal and the lateral dimensions of the cover plate are in excess of the distance between incisions 27 and incisions 22, respectively. Thus, when extensions 26 and extensions 28 are passed through incisions 27 and 22 respectively, the extensions will protrude through the incisions and will lie underneath the base portion thereby securely locking the cover plate thereto. The base portion is provided with a coating of a suitable cementing material on its under face for applying the complete mounting frame structure to a supporting surface. It will be noted that in the finished and assembled condition of this mounting frame, no openings or ports are provided for the picture which has to be introduced prior to cementing the complete mounting frame to the supporting surface. While for this reason the insertion of the picture is slightly more difficult than in the previous embodiments, due to the absence of ports, the picture is completely enclosed and covered and the entrance of dust and of dirt is positively and completely prevented.

As it will be observed from Fig. 8, the base portions of the mounting frames may be provided with an opening 37 in view of the fact that this part of the mounting frame is not necessary for the support of the picture or of the cover plate. Of course, this opening has to be smaller than the picture to be introduced underneath the cover plate. The advantage of the provision of this opening is a saving in material and a further lightening of the finished structure which closely approaches the appearance of an attractive picture frame. Although Fig. 8 illustrates the concept of providing an opening in the base portion as applied to the embodiment in Figs. 1 to 3, obviously such opening may be provided in any one of the other described embodiments.

It will be noted that the mounting frame of the invention provides very important advantages. First of all, a mounting frame of an extremely thin, light and flexible character is provided of which a large number may be mounted on the pages of a picture album without greatly increasing the thickness of the complete album. In addition, the first time in the history of the art, a mounting frame is disclosed which is adapted to provide a receptacle for the negative immediately behind the photograph and protects it from dust, dirt and mechanical injury. Thus, the photograph above the negative may serve as a filing index for the negative which may be easily removed from the frame at any time for reprints or other purposes.

It is also to be observed that the mounting frame of the invention is very attractive in its appearance, provides full protection of the inserted picture from dust, dirt and mechanical injury and provides a full substitute for the bulky and expensive conventional mounting frames heretofore used.

Moreover, the mounting frames of the invention are extremely simple in construction, are constituted of readily obtainable and inexpensive material and may be manufactured on a practical and commercial scale at a very low cost.

Although the present invention has been described in accordance with a few preferred embodiments thereof, variations and modifications may be resorted to by those skilled in the art without departing from the spirit and scope of the present invention. We consider all of these variations and modifications as within the true spirit and scope of the present invention as disclosed in the foregoing description and defined by the appended claims.

We claim:

1. A mounting frame for pictures comprising in combination, a quadrangular base portion constituted of a sheet-like material, a plurality of slits provided in said base portion in parallel-spaced position with the edges thereof, at least two of said slits being parallel to each other, a transparent cover plate having marginal portions extending at least at two sides thereof beyond the surface defined by said slits, and tongues integrally formed with said cover plate at said edges forming extensions of said cover plate in the direction of said parallel slits, said marginal portions and said tongues of said cover plate being adapted to be passed through said slits and to form an interlocked structure.

2. A mounting frame for pictures comprising in combination, a quadrangular base portion constituted of a sheet-like material, a pair of longitudinal slits provided in said base portion in parallel-spaced position with the longitudinal edges thereof, a transparent cover plate having marginal portions extending beyond the distance between said slits, and tongues integrally formed with said cover plate forming extensions of said cover plate in the direction of said slits, said marginal portions and said tongues of said cover plate being adapted to be passed through said slits and to form an interlocked structure.

3. A mounting frame for pictures comprising in combination, a base portion of sheet-like material, a pair of longitudinal slits provided in said base portion in parallel-spaced position, a lateral slit located at some distance from the ends of said longitudinal slits, a transparent cover plate having longitudinal marginal portions extending beyond the distance between said longitudinal slits and a lateral extension extending beyond said lateral slit, and tongues forming extensions of said longitudinal marginal portions, said extensions and said tongues being adapted to be passed through said slits to form an interlocked structure having a single port for the introduction of a picture.

GUIDO PERERA.
ROBERT C. MYLES, Jr.